UNITED STATES PATENT OFFICE.

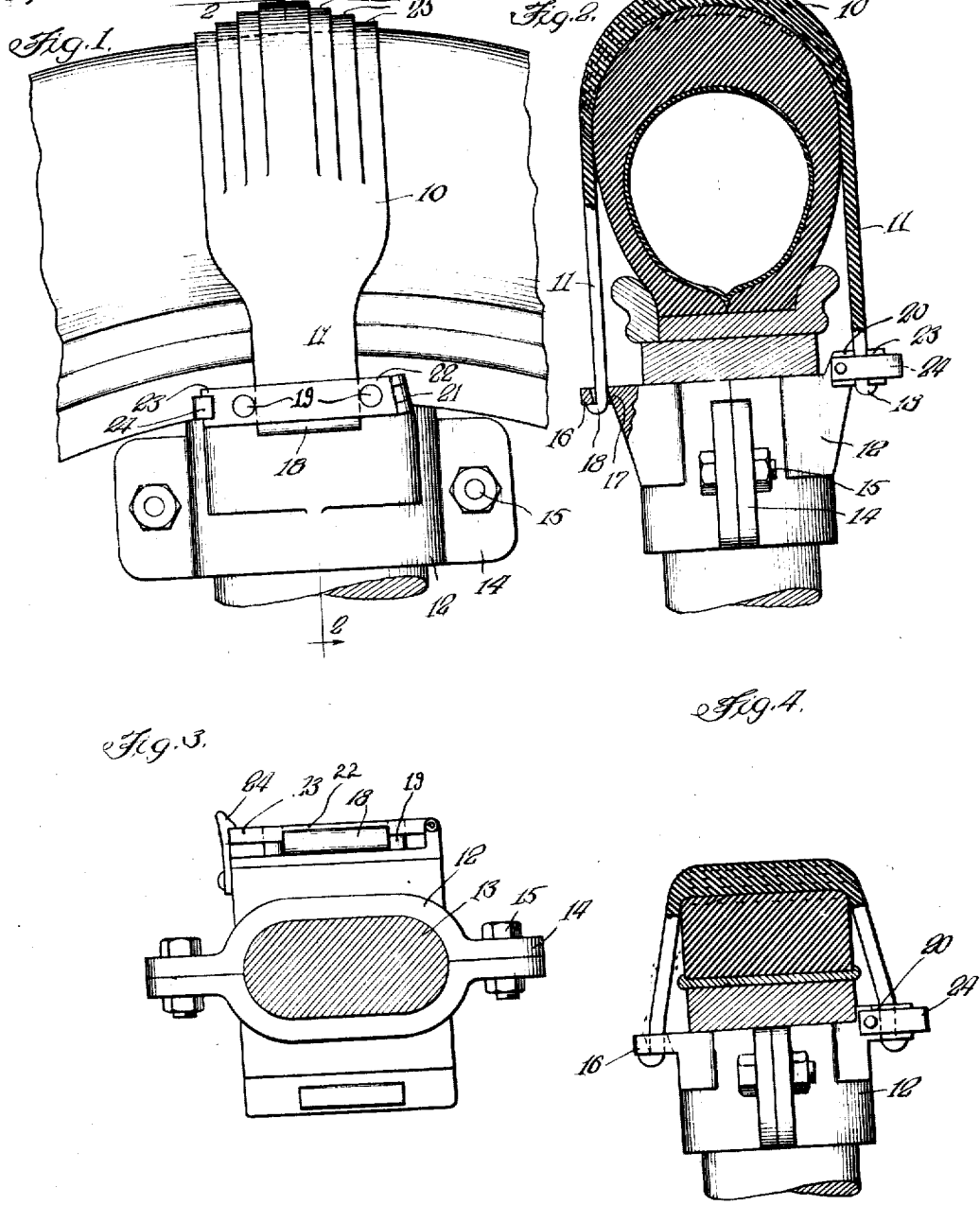

JULIUS E. HETTINGER, OF CHICAGO, ILLINOIS.

NON-SKIDDING DEVICE.

1,369,808.   Specification of Letters Patent.   Patented Mar. 1, 1921.

Application filed February 12, 1920. Serial No. 358,277.

*To all whom it may concern:*

Be it known that I, JULIUS E. HETTINGER, a citizen of the United States, residing at Chicago, in the county of Cook and State of Illinois, have invented certain new and useful Improvements in Non-Skidding Devices, of which the following is a specification.

This invention relates to non-skid devices to be applied to rubber tires used on vehicles, such as automobiles, to prevent the wheels from skidding in any direction, and to prevent friction between the wheel and the surface of the ground in starting or stopping the vehicle. One object of the invention is to provide a suitable device for applying to the wheel which is of such a nature that it may be very quickly and easily applied or removed, and arranged so that it will be very effective in preventing the slipping of the wheel on the surface of the ground under any ordinary circumstances. A further object is to provide a device which will be noiseless and will be dependable, and one which will not injure the rubber tire, and which will not wear out with any ordinary amount of use, or become broken or deranged.

Of the accompanying drawings Figure 1 is an elevation of a device, applied to a wheel, which embodies features of my invention; Fig. 2 is a sectional view of the same along the line 2—2 of Fig. 1; Fig. 3 is a view of the underside of the device; and Fig. 4 is an elevation of a similar device applied to a solid tire wheel.

In general my non-skid device comprises a U-shaped shoe which is passed over the tire of the wheel with the arms extending radially inward, one on each side of the wheel, and with the ends of the arms fastened to a collar or clamp which is held in place by the spoke of the wheel, or in any other suitable manner. As many of these shoes may be applied to the wheel as may be desired; but in practice two or three are sufficient, and one will ordinarily serve all purposes, particularly the purpose of preventing rotational slipping of the wheel on the road bed.

The shoe 10 comprises a heavy U-shaped strap with arms or shanks 11 arranged to hold the shoe on the wheel. The means which I provide for holding the shoe comprises a split collar 12 arranged to encircle the spoke of the wheel, it being understood that the collar may be formed to fit any shape of spoke. The collar is clamped to the spoke by means of the lugs 14, and bolts 15, or in any other suitable manner. Extending outwardly from the upper surface of the collar, on one side thereof, is a lug 16, having a slot 17 therethrough, and one arm 11 of the shoe is adapted to pass through this slot. On the lower end of each arm 11 is a hook 18. The shape of the slot 17 with reference to the hook 18 is such that when the arm 11 is turned away from the tire a certain distance the hook will pass down through the slot, but when the arm is moved over to its normal position adjacent the tire, as shown in Fig. 2, the hook holds the arm from passing out of the slot. The shoe and the arms 11 are so made that they can be sprung sufficiently to allow the placing of the shoe over the tire after one arm 11 has been placed in the slot 17. The arms are similarly formed and the holding means are so arranged that either arm may be placed in either holding means, the arms being thus interchangeable.

On the opposite side of the collar 12 is a lug 20 arranged to hold in place the other arm of the shoe. Hinged to the lug 20 by hinge 21 is a plate 22. When the free end 23 of this plate is turned outwardly from the lug the angular arrangement of the hinge 21 is such that the free end of the plate rises materially, and the hook 18 of the arm 11 may be forced under the lower edge of the plate. The end 23 of the plate is then forced back against the arm to its normal position, thus pulling the shoe 10 snugly against the rubber tire; and a latch 24 is arranged so as to spring over the end 23 of the plate and hold the plate firmly in place. The pins 19 fixed to the collar pass through openings in the plate 22, and prevent upward movement of the plate or sidewise movement of the arm 11. In this manner the entire apparatus is held snugly so that there is no rattling of the parts and the shoe fits snugly on the tire, but without depressing the tire inwardly; and it is to be understood that the inner surface of the shoe is arranged to come in contact at all points with the tire, being concave both transversely and longitudinally in accordance with the normal shape of the tire.

The arms 11 are thus held so as to prevent any outward movement radially of the shoe, yet radial movement inward is not prevented, as the arms are free to pass inwardly in the slot 17 and in the space formed between the lug 20 and plate 22, so that when the wheel rotates, bringing the shoe on the road bed, the shoe is free to be pressed inwardly except as it is opposed by the pressure of the tire itself. This being so no appreciable jar is caused by the rotation of the wheel due to the shoe. In order to still further reduce any jarring tendency, and for other reasons, I provide the outer surface of the shoe with steps 25, so that the outer portions of the shoe which come first in contact with the ground are thin and will cause only a slight depression in the tire, and thus will prevent jarring; yet the central portions of the shoe are sufficiently thick to produce very material friction on the surface of the ground, and prevent skidding or undesirable rotation of the wheel thereon.

In this manner I provide a device which is similar in its action to the ordinary non-skidding chain used on wheels, but one which does not have the disadvantage of causing injury to the tire, and which has enormous wearing qualities compared with the ordinary chain, and also one which can be very quickly applied or removed.

Fig. 4 illustrates a modification of the shoe applied to a solid tire. As the various parts are very similar to the corresponding parts of the shoe as applied to the pneumatic tire, a special description of this modification is not thought necessary. It is to be understood also that other modifications in the device could be made by those skilled in the art without departing from the spirit of the invention as disclosed by the following claims.

I claim as my invention:

1. A non-skid device for rubber tired wheels comprising a shoe, having arms adapted to extend inwardly on opposite sides of the tire, similar angular projections fixed to the outer ends of the arms, a collar arranged to encircle the outer end of a spoke of the wheel, lugs projecting from each side of the collar and adapted to receive and hold the respective arm projections, and means connected with one of said lugs for pulling inwardly on the corresponding projection as it is placed in the holding position with reference to the lug.

2. A non-skidding device for rubber tired wheels comprising a U-shaped member having two arms, an angular projection on the end of each of said arms, means adapted to be fixed to the wheel for holding the inner ends of said arms, said means comprising a plate hinged to said holding means, said hinge being placed angularly so that the free end of said plate moves outwardly radially as the end is moved outwardly from the holding means, whereby the projection on one of the arms can be passed under the plate and the plate when forced inwardly will hold the shoe snugly in place.

3. A non-skidding device comprising a U-shaped shoe arranged to pass over the tire of a wheel with its arms extending inwardly, and means for holding the said shoe on the wheel, the shoe being materially thicker near the central portions than near the edges, the outer surface formed of steps running longitudinally of the shoe.

4. A non-skidding device for wheels comprising a shoe adapted to be placed over the tire of a wheel, said shoe having an arm arranged to extend inwardly on each side of the tire, shoe holding means arranged to be fixed to the wheel with a lug extending on each side of the wheel, one of the lugs having a radial opening therethrough adapted to receive one of said arms which has an angular projection on its end for holding the arm in the opening, and means on the other lug for grasping the other arm and pulling the shoe tightly against the tire.

5. A non-skidding device for wheels comprising a shoe adapted to be placed over the tire of a wheel, arms fixed to said shoe and arranged to extend on opposite sides of said tire, similar projections fixed angularly to the outer ends of said arms, shoe holding means arranged to be fixed to the wheel, and means fixed to said holding means for grasping and pulling on said projections.

In testimony whereof, I hereunto set my hand.

JULIUS E. HETTINGER.